(12) United States Patent
Gjerde et al.

(10) Patent No.: US 9,525,501 B2
(45) Date of Patent: Dec. 20, 2016

(54) AUTOMATIC RENDER GENERATION OF AN AUDIO SOURCE

(75) Inventors: Jamie Ronald Gjerde, Seattle, WA (US); Matthew Gehring Stegner, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 662 days.

(21) Appl. No.: 13/153,360

(22) Filed: Jun. 3, 2011

(65) Prior Publication Data

US 2013/0129098 A1    May 23, 2013

(51) Int. Cl.
*H03G 3/00* (2006.01)
*H04H 60/04* (2008.01)
*G11B 27/034* (2006.01)

(52) U.S. Cl.
CPC ............ *H04H 60/04* (2013.01); *G11B 27/034* (2013.01)

(58) Field of Classification Search
CPC ...... G10H 1/0091; G06T 15/00; G06T 15/005
USPC ............... 381/2, 56, 61, 80, 63; 345/473
See application file for complete search history.

(56) References Cited

U.S. PATENT DOCUMENTS

| | | | |
|---|---|---|---|
| 5,764,231 A * | 6/1998 | Ray | H04N 1/00201 345/419 |
| 6,144,375 A | 11/2000 | Jain et al. | |
| 6,501,476 B1 * | 12/2002 | Gould | G06T 15/00 345/473 |
| 2004/0233810 A1 | 11/2004 | An | |

FOREIGN PATENT DOCUMENTS

| | | | | |
|---|---|---|---|---|
| BE | EP 2323313 A1 * | 5/2011 | ......... | H04L 12/2812 |
| EP | 2323313 A1 * | 5/2011 | | |

OTHER PUBLICATIONS

Sony, Vegas 5 User Manual, 2004, p. 271, 310, 317, 338.*
Precision Slow Motion, Vega, 2011.*
Vegas 5 User Manual, Sony, 2004.*

* cited by examiner

*Primary Examiner* — Xu Mei
*Assistant Examiner* — William A Jerez Lora
(74) *Attorney, Agent, or Firm* — Wolfe-SBMC (57) ABSTRACT

An input indicates a request for rendering of an audio source in a clip of an audio track according to an effect. Further, a cloned audio source is generated. The cloned audio source is a copy of the audio source. A cloned effect is generated. The cloned effect is a copy of the effect. The cloned audio source is processed according to the cloned effect to generate a rendered output file. The rendered output file is played without processing the audio source according to the effect.

21 Claims, 6 Drawing Sheets

AUTOMATIC RENDER GENERATION OF AN AUDIO SOURCE

BACKGROUND

1. Field

This disclosure generally relates to audio environments. More particularly, the disclosure relates to an editable audio track environment.

2. General Background

Digital audio workstations are typically utilized to generate and edit audio tracks. As an example, digital audio workstations typically allow a user to edit individual audio tracks and then combine those audio tracks into an audio mix. The processing load for such digital audio workstations can be quite high when audio tracks are being edited. Accordingly, users of the digital audio workstations typically freeze one or more audio tracks to reduce the processing load for the processors operably connected to the digital audio workstations. By freezing the one or more audio tracks, the users are rendering the real-time audio effects to temporary files on disk. In other words, an output file of the rendering representing the output of track is generated rather than rendering the real-time audio effects to an output device such as a speaker. If the real-time audio effects were rendered to a speaker, then a user would have to process the effects again the next time he or she would like to listen to the audio track. However, freezing an audio track so that a rendered output file is generated allows a user to play that rendered output file subsequent times without having to process the audio track through the real-time audio effects each subsequent time, which saves processing power on the host computer from having to generate effects in real-time.

Although track freezing helps users reduce processing workload, no edits can be performed on the track while the track is in the frozen state. Most applications typically lock frozen tracks for edits or ignore edits for frozen tracks. The user has to manually unfreeze the track, perform the edit, and then manually re-freeze the track. As a result, a user may have to perform a large number of manual interactions to perform audio track editing. The process of manually unfreezing, applying edits, and re-freezing audio tracks is a tedious process. Further, some applications incorrectly place a freeze on a separate track in the audio mix that is unrelated to the frozen track. Therefore, typical digital audio workstation configurations involve a cumbersome editing process that may lead to extensive inefficiencies in the resources and time utilized to complete a rendering of an audio track.

SUMMARY

In one aspect of the disclosure, a computer program product is provided. The computer program product includes a computer useable medium having a computer readable program. The computer readable program when executed on a computer causes the computer to receive an input indicating a request for rendering of an audio source in a clip of an audio track according to an effect. Further, the computer readable program when executed on the computer causes the computer to generate a cloned audio source. The cloned audio source is a copy of a plurality of audio source settings associated with the audio source that is applied to the audio source. In addition, the computer readable program when executed on the computer causes the computer to generate a cloned effect. The cloned effect is a copy of the effect. The computer readable program when executed on the computer causes the computer to process the cloned audio source according to the cloned effect to generate a rendered output file. Further, the computer readable program when executed on the computer causes the computer to play the rendered output file without processing the audio source according to the effect.

In another aspect of the disclosure, a process is provided. The process receives an input indicating a request for rendering of an audio source in a clip of an audio track according to an effect. Further, the process generates a cloned audio source. The cloned audio source is a copy of a plurality of audio source settings associated with the audio source that is applied to the audio source. In addition, the process generates a cloned effect. The cloned effect is a copy of the effect. The process also processes the cloned audio source according to the cloned effect to generate a rendered output file. Further, the process plays the rendered output file without processing the audio source according to the effect.

In yet another aspect of the disclosure, a system is provided. The system includes a reception module that receives an input indicating a request for rendering of an audio source in a clip of an audio track according to an effect. Further, the system includes a processor that generates a cloned audio source, generates a cloned effect, processes the cloned audio source according to the cloned effect to generate a rendered output file, and plays the rendered output file without processing the audio source according to the effect. The cloned audio source is a copy of a plurality of audio source settings associated with the audio source that is applied to the audio source. The cloned effect is a copy of the effect.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

An automatic render generation system is utilized to edit an editable audio track. The automatic render generation system removes the manual user interaction to facilitate a seamless de-freezing and re-freezing of an editable audio track. Further, the automatic render generation system allows each aspect of a frozen track to be edited as any unfrozen track would be edited. Such editing may be performed on the frozen track while the frozen or rendered state is maintained. As a result, the automatic render generation system increases user efficiency and ease of use.

The term render is utilized herein to mean the processing of an audio source through at least one effect. As an example, an effect may be a volume, reverberation, chorus, delay, equalizer, noise reduction, pitch and time stretch, audio synthesis, gating, compression, distortion, or the like. These examples are only intended as examples as various other effects may be utilized.

Further the term track is utilized herein to include at least one clip. Each clip may have its own unique audio source. Accordingly, a single track may have multiple audio sources.

Figure 1:
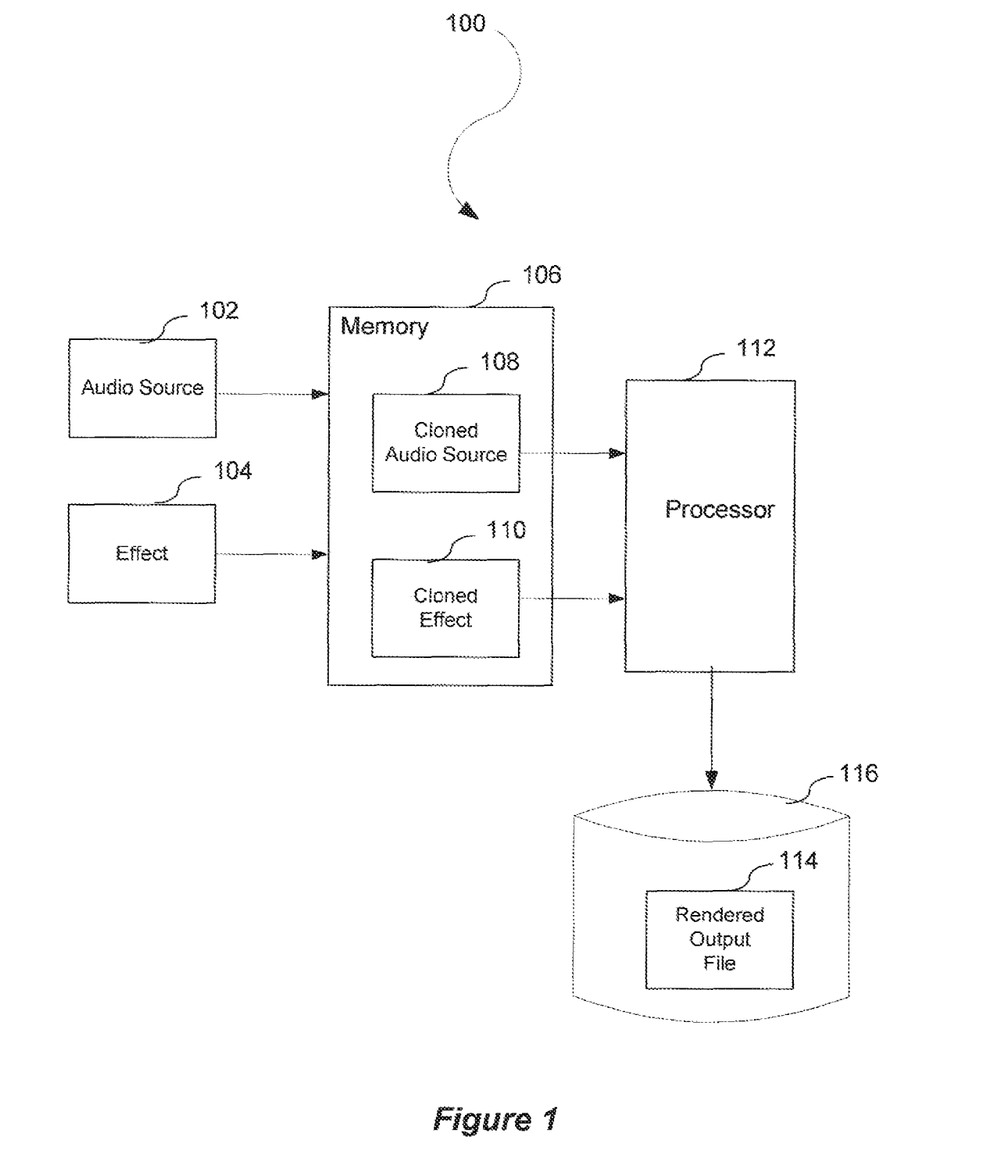
FIG. 1 illustrates an automatic render generation system.

FIG. 1 illustrates an automatic render generation system 100. An audio source 102 from a clip on an audio track and an effect 104 are provided to the automatic render generation system 100. The automatic render generation system generates a cloned audio source 108, which is a copy of a plurality of audio source settings associated with the audio source 102 that is applied to the audio source 102, and generates a cloned effect, which is a copy of the effect 104. In other words, the cloned audio source 102 itself is stored in a storage device, but various audio source settings that are applied to the audio source 102 are cloned. Examples of audio source settings include start time of a clip, end time of a clip, a mute property, an in-point of a clip, or the like. An in-point is the start point of a source file on disk. As an example, a clip on an audio track may be one second long. The clip may start at the two second mark on the track. The source file may be twenty seconds long and may have the clip at a start time of ten seconds and an end time of eleven seconds. Accordingly, the in-point for the clip may be the ten second mark in the source file.

The cloned audio source 108 and the cloned effect 110 may be stored in a memory 106. The cloned audio source 108 and the cloned effect 110 may be provided to a processor 112 so that the processor 112 may process the cloned audio source 108 through the effect 110. As an example, a copy of a song and a copy of a reverberation effect may be provided to the processor 112. The processor 112 then processes the copy of the song with the copy of the reverberation effect to modify the copy of the song to have the copy of the reverberation effect. As a result, the processor 112 generates a rendered output file 114 that is a modified version of the cloned audio source 108 that incorporates the cloned effect 110, e.g., the modified song. Accordingly, the automatic render generation system 100 has generated an output file in which the processing has already been performed. The rendered output file 114 may be stored on a disk 116.

During the processing of the cloned audio source 108 and the cloned effect 110 by the processor 112, the audio source 102 is available to be played or edited by the user. For example, a user may indicate that rendering of the audio source 102 should be performed. If the user requests playback of the audio source 102 after the rendered output file 114 has been processed, the rendered output file 114 may simply be read from the disk 116 into the memory 106 for playback. As the rendered output file 114 already includes the processing of the cloned effect 110, no additional processing has to be performed for playback. If the user requests playback of the audio source 102 after rendering has begun, but before the rendered output file 114 has been processed, the portion of the rendered output file 114 that has been rendered may be utilized and any remaining portion may be played back as a result of real-time processing of the remaining portion of the audio source 102 and the effect 104 by the processor 112. The rendered output file 114 may still be generated based on part of the cloned audio source 108, part of the cloned effect 110, part of the audio source 102, and/or part of the effect 104 so that future playback may be read from the disk 116 without additional processing. If the user requests playback without a rendering or with a rendering, but prior to any partial rendering of the rendered output file 114, the automatic render generation system 100 renders the audio source 102 through the effect 104 in real-time by processing, with the processor 112, the audio source 102 through the effect 104. The rendered output file 114 may still be generated based on the audio source 102 and the effect 104 so that future playback may be read from the disk 116 without additional processing.

Accordingly, the user may listen to a seamless playback that does not involve multiple tedious interactions other than an initial rendering input. The cloned audio source 108 and the cloned effect 110 may be discarded after the rendered output file 114 is generated.

With respect to an edit after the user has indicated that rendering of the audio source 102 should be performed, but prior to completion of the rendered output file 114, a new cloned audio source 108 and a new cloned effect 110 are generated. Accordingly, the automatic render generation system 100 automatically detects an edit to the audio source 102 and generates a rendered output file that incorporates the edit without the user having to provide any manual rendering interactions after the initial render input. The edit to the audio source 102 may be performed instantly. For example, a user may wish to make many edits to the audio source 102 during rendering of the rendered output file 114 and may avoid having to input a re-render command after each of those edits. The old cloned audio source 108, the old cloned effect 110, and the partial rendered output file 114 may be discarded. Many new cloned audio sources 108, new cloned effects 110, and new rendered output files 114 may be generated during the process of many edits, but such automatic generations do not interfere with the user's interaction with the audio source 102 and the effect 104.

As an audio track having the audio source 102 may be played back without processing the effect 104, a logical representation of the effect 104 may be provided. In other words, the effect 104 as displayed in a user interface may only be an indicia, symbol, or the like.

Figure 2:
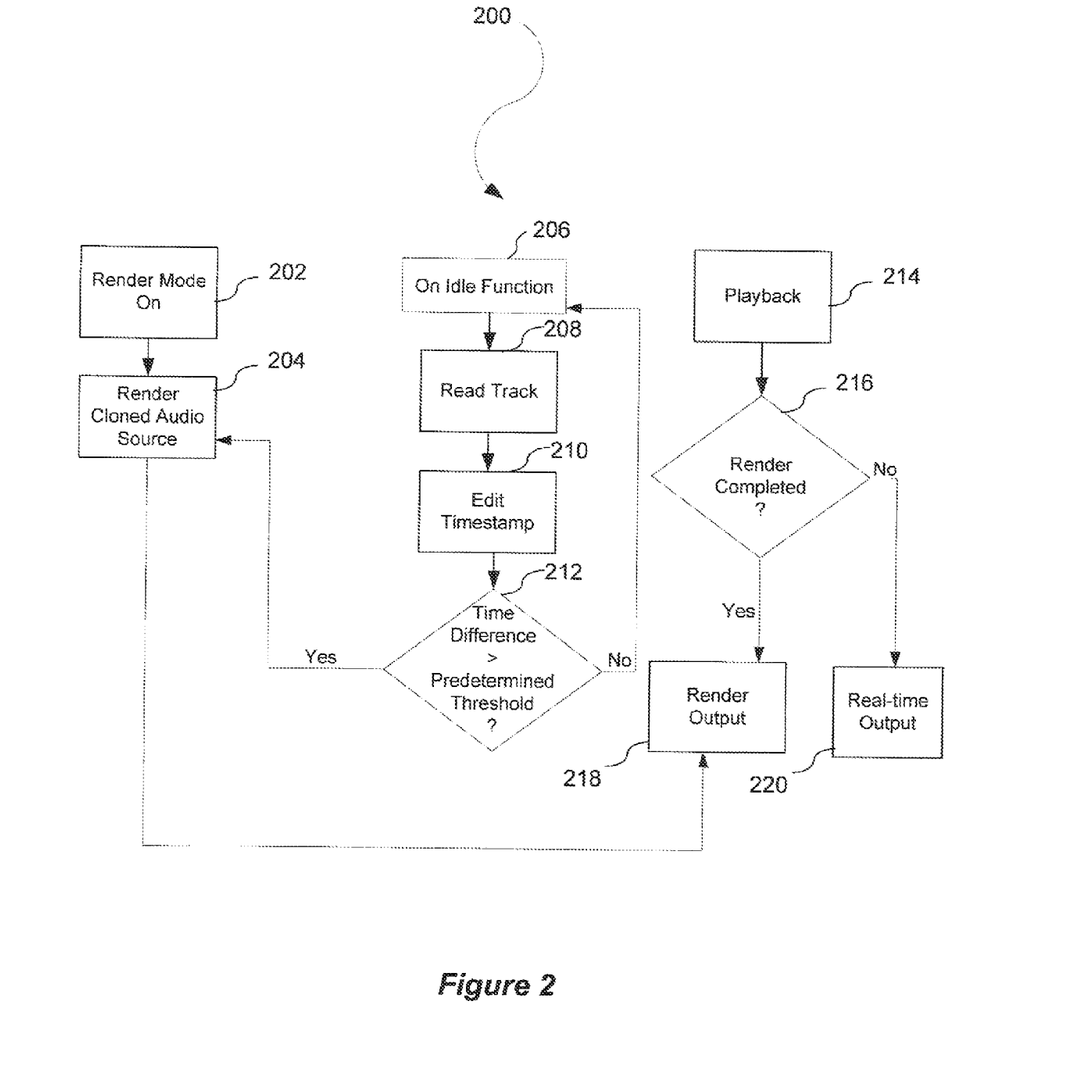
FIG. 2 illustrates an automatic render generation process.

FIG. 2 illustrates an automatic render generation process 200. The automatic render generation process 200 receives an input indicating a request for rendering of an audio track displayed in an audio track user interface at a request time. As an example, a user may provide such an input through a toggle button, menu selection, or the like in an audio track user interface. As a result, the render mode is turned on at a block 202. Further, at a block 204, rendering of a cloned audio source is initiated. The cloned audio track is an uneditable copy of the audio source. In other words, the cloned audio source is frozen. In one embodiment, the cloned audio source is frozen at the time of the request for rendering. Accordingly, the cloned audio source will have the state of the editable audio track at that time. In one embodiment, the rendering of the cloned audio source involves processing the cloned audio source and effects associated with the cloned audio track to a storage device. The storage device may be a memory, hard drive, flash drive, CD, DVD, or the like.

If an edit is requested on the audio source and/or at least one effect during rendering of the cloned audio source, the cloned audio source may be invalidated and/or discarded. As an example, an on idle function 206 may be utilized to intermittently monitor any changes to the audio source. The on idle function 206 may read the audio source at a block 208 and read a timestamp at a block 210. The timestamp may have an edit time of the edit. The edit to the audio source may be performed instantly. Further, at a decision block 212, the automatic render generation process 200 determines if the difference between the current system time and the timestamp is greater than a predetermined threshold. For example, a predetermined threshold may be one second. Accordingly, the automatic render generation process 200 may wait to generate a cloned audio source and/or a cloned effect based on an edit to the audio source and/or an effect that happens in less than a second time difference between the current system time and the timestamp to avoid having to invalidate the cloned audio source too many times. The automatic render generation process 200 may wait until an edit that occurs after the predetermined threshold to incorporate all of the changes that happened since the last edit as a group into the new cloned audio source at the process block 204. The time analysis is optional as the automatic render generation process 200 may be utilized without any time analysis. The edit to the audio source may be performed instantaneously irrespective of whether or not time analysis is utilized for generating clones. The automatic render generation process 200 may render a new cloned audio source each time an edit to the audio source and/or at least one effect is requested. In one embodiment, a cloned audio source is invalidated upon an edit of the editable audio track. The new cloned audio source is then rendered. A background thread may be utilized to generate the new cloned audio source. In an alternative embodiment, the cloned audio source may be invalidated after the new cloned audio source is rendered. In yet another alternative embodiment, the cloned audio source may be invalidated simultaneously with the rendering of the cloned audio source.

In one embodiment, the automatic render generation process 200 also allows for playback of the audio source at a block 214. At a decision block 216, the automatic render generation process 200 determines if render of the editable audio track is completed. If the render is completed, the render output may be utilized at a block 218. However, if the render is still incomplete, the real-time output may be utilized at a block 220. In one embodiment, an edit can be made to the audio source during playback of the audio source. The change is automatically included in a new cloned audio source. Accordingly, playback may be started before a render finishes while an audio source is in render mode and a render is still in process. The audio source and the effects associated with the editable audio track may be processed in real-time. When the render finishes, if playback is still happening, the render will come online and the original audio source and effects will be immediately bypassed.

Figure 3A:
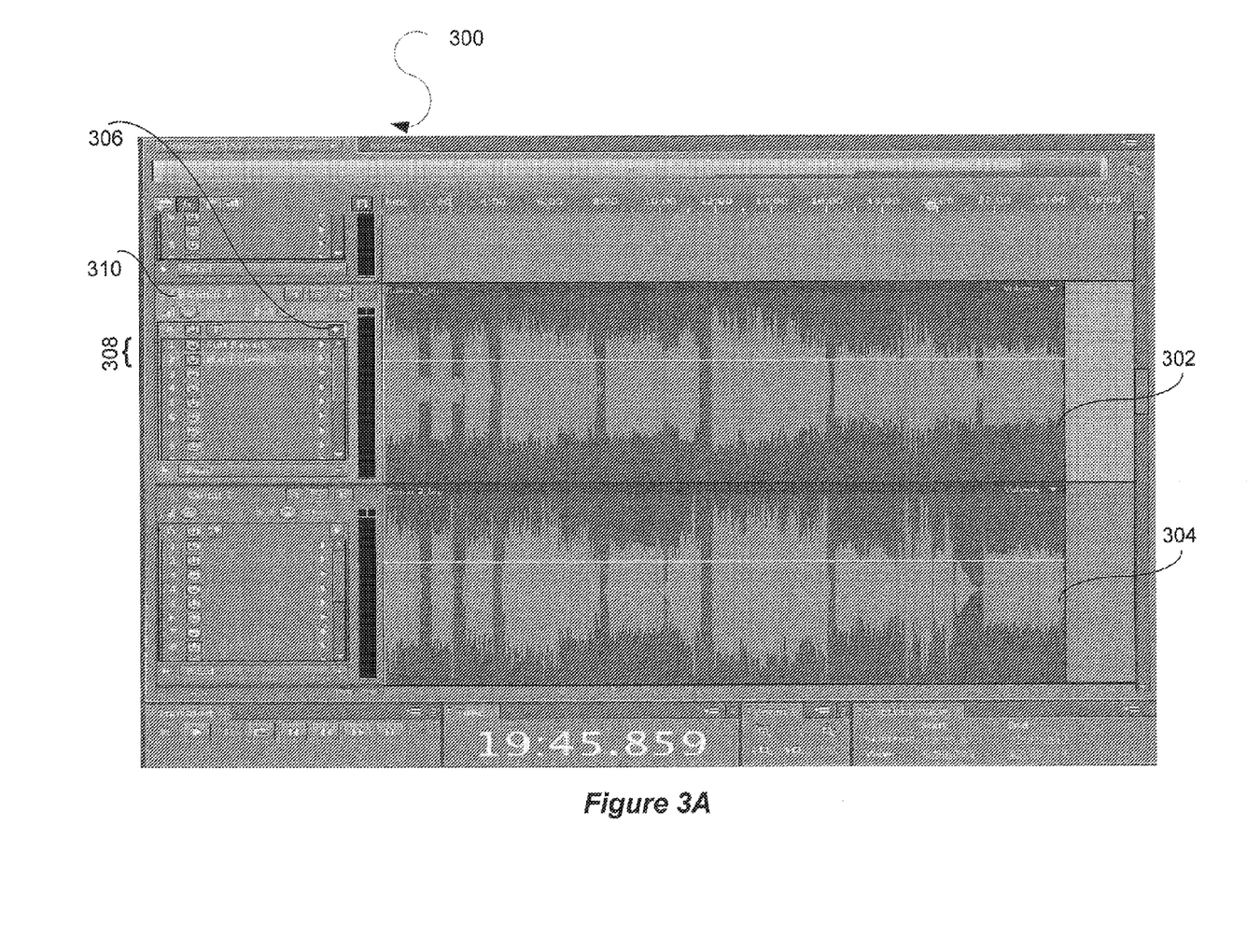
FIG. 3A illustrates an example of an audio track user interface that may be utilized to provide automatic render generation.

FIG. 3A illustrates an example of an audio track user interface 300 that may be utilized to provide automatic render generation. The audio track user interface 300 may have a plurality of audio tracks such as a first audio track 302 and a second audio track 304. As examples, the first audio track 302 may be for Guitar 1 and the second audio track 304 may be for Guitar 2. A render actuator 306 may receive an input from a user to indicate that automatic render generation should be provided for a selected track. Further, various effects 308 such as a reverberation and a hard limiter are utilized as examples. In addition, a progress indicator 310 may provide an indication of the progress of the rendering. As an example, the progress indicator may be a pie symbol that fills up to indicate the progress of the rendering.

Figure 3B:
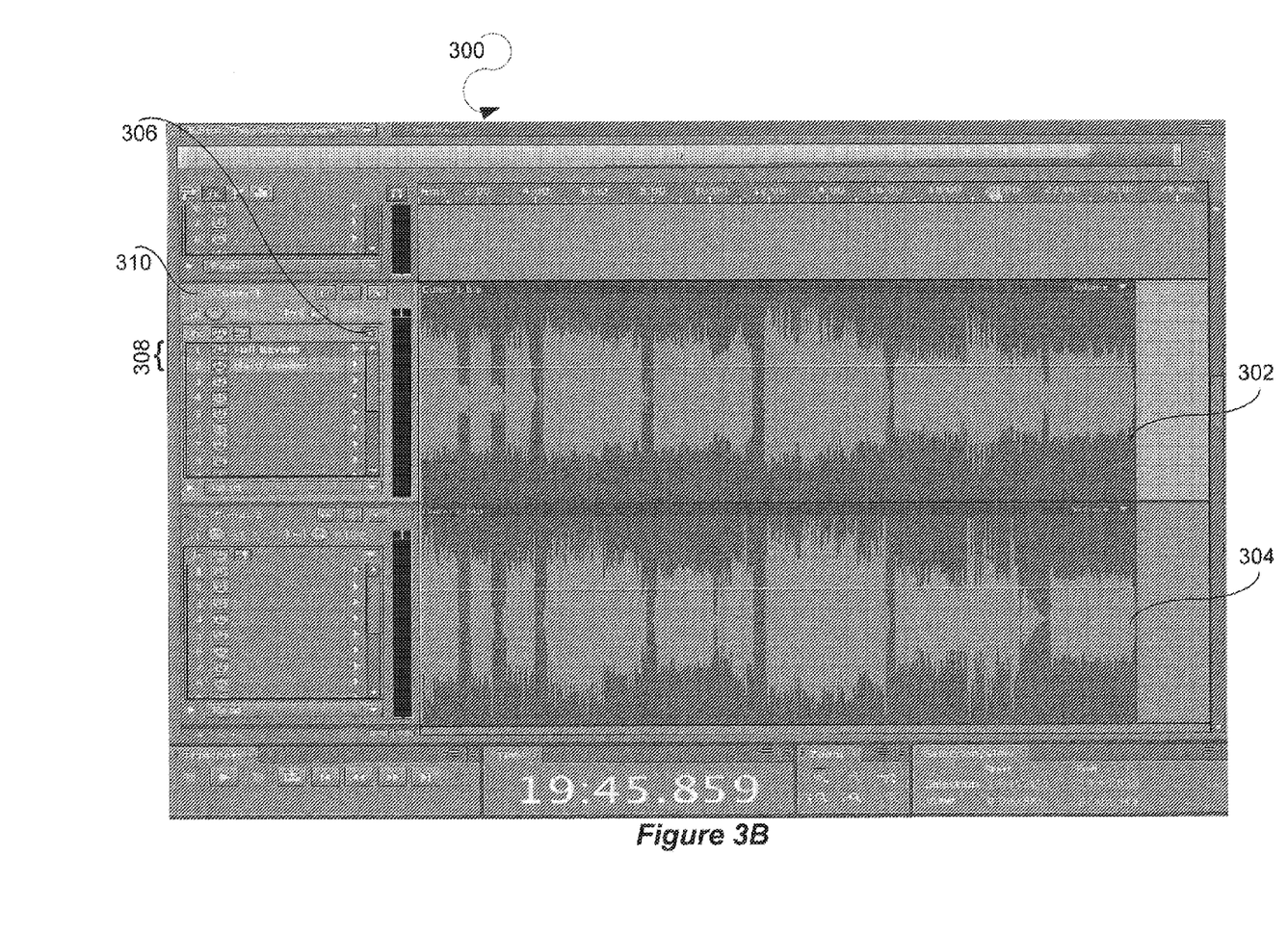
FIG. 3B illustrates the audio track user interface illustrated in FIG. 2B in which rendering has been completed.

FIG. 3B illustrates the audio track user interface 200 illustrated in FIG. 2B in which rendering has been completed. The progress indicator 208 may change shapes. As an example, the progress indicator 208 may display a waveform to indicate that rendering is complete. However, a variety of shapes, colors, text, images, etc. may be utilized for the progress indicator 208 to indicate partial and/or complete progress.

Figure 4:
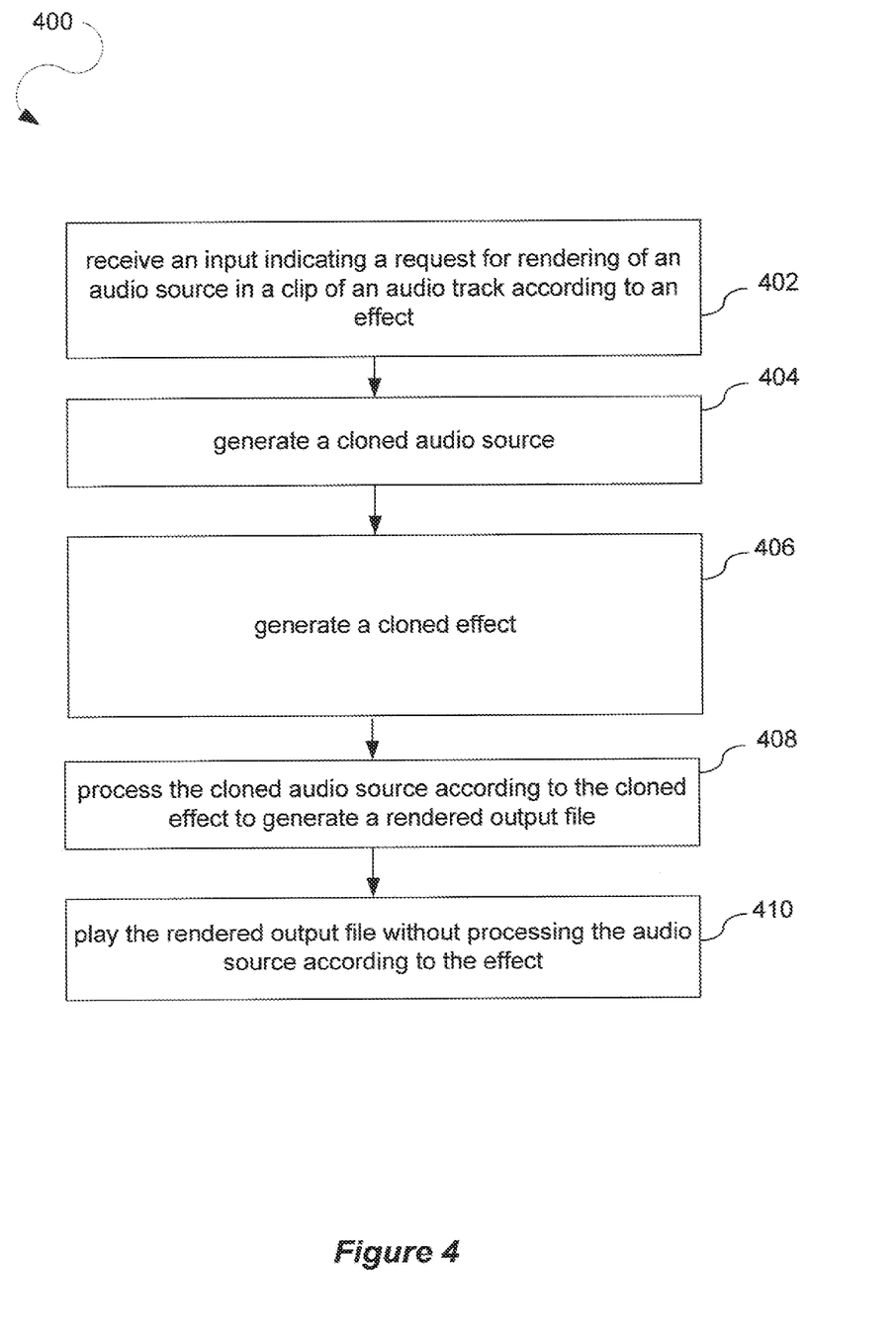
FIG. 4 illustrates a process that may be utilized to perform automatic rendering of an audio source.

FIG. 4 illustrates a process 400 that may be utilized to perform automatic rendering of an audio source. At a process block 402, the process 400 receives an input indicating a request for rendering of an audio source in a clip of an audio track according to an effect. Further, at a process block 404, the process 400 generates a cloned audio source. The cloned audio source is a copy of a plurality of audio source settings associated with the audio source that is applied to the audio source. In addition, at a process block 406, the process 400 generates a cloned effect. The cloned effect is a copy of the effect. At a process block 408, the process 400 also processes the cloned audio source according to the cloned effect to generate a rendered output file. Further, at a process block 400 the process 400 plays the rendered output file without processing the audio source according to the effect.

Any of the configurations described herein may be utilized with a variety of audio programs. Further, any of the configurations described herein may be utilized with a variety of different user interfaces.

Any of the configurations described herein may be utilized to render an audio source through other types of processing besides effect processing. As an example, more audio may be added to an audio source after the rendered output file is generated. A new cloned audio source may be generated by processing at least one effect without generating a cloned effect to obtain a new rendered output file that includes the change to the audio source. Accordingly, cloning of the effect may or may not be utilized depending on the type of editing being performed.

Figure 5:
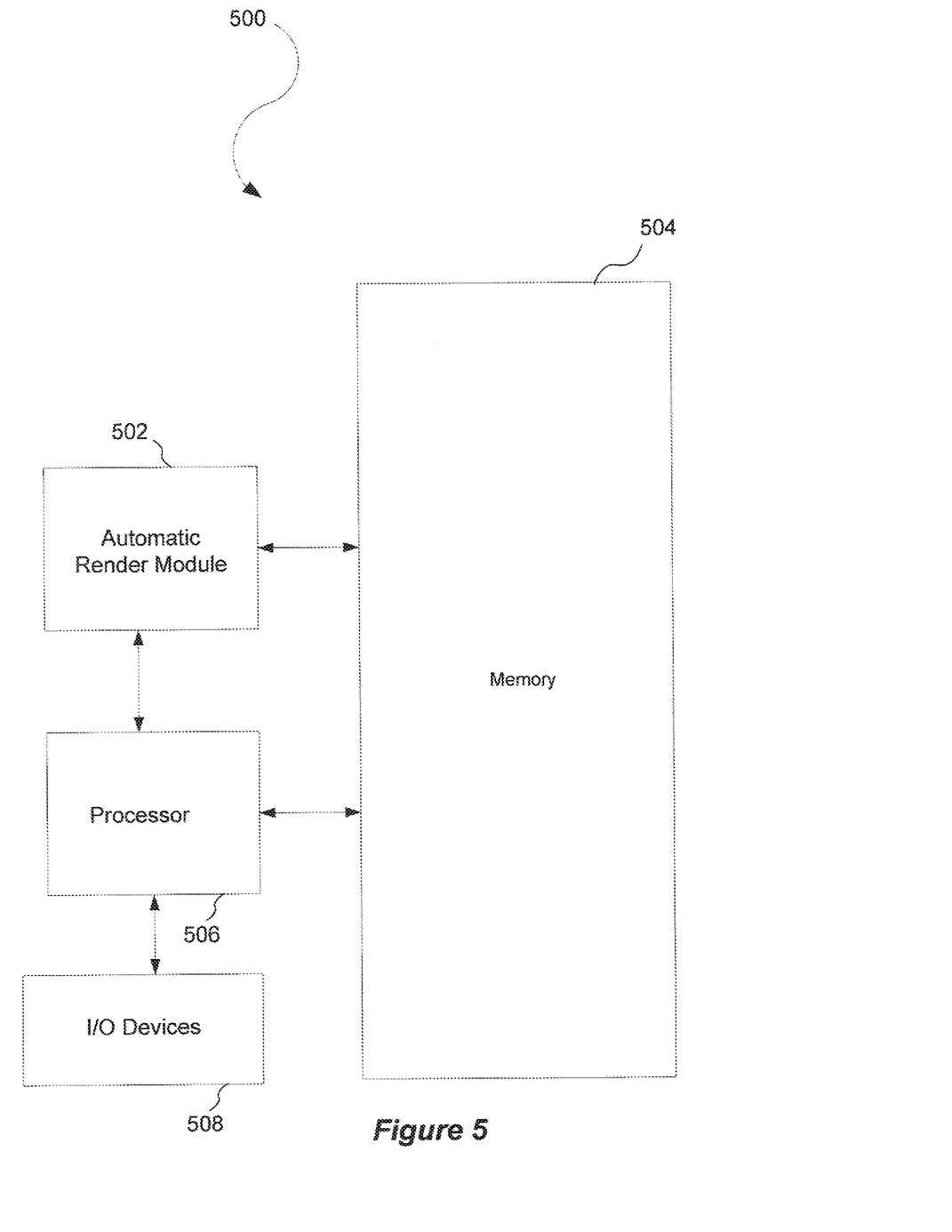
FIG. 5 illustrates a system configuration that may be utilized for automatic rendering of an audio source.

FIG. 5 illustrates a system configuration 500 that may be utilized for automatic rendering of an audio source. In one embodiment, an automatic render module 502 interacts with a memory 504 and a processor 506. In one embodiment, the system configuration 500 is suitable for storing and/or executing program code and is implemented using a general purpose computer or any other hardware equivalents. The processor 506 is coupled, either directly or indirectly, to the memory 504 through a system bus. The memory 504 can include local memory employed during actual execution of the program code, bulk storage, and/or cache memories which provide temporary storage of at least some program code in order to reduce the number of times code must be retrieved from bulk storage during execution.

The Input/Output ("I/O") devices 508 can be coupled directly to the system configuration 500 or through intervening input/output controllers. Further, the I/O devices 508 may include a keyboard, a keypad, a mouse, a microphone for capturing speech commands, a pointing device, and other user input devices that will be recognized by one of ordinary skill in the art. Further, the I/O devices 508 may include output devices such as a printer, display screen, or the like. Further, the I/O devices 508 may include a receiver, transmitter, speaker, display, image capture sensor, biometric sensor, etc. In addition, the I/O devices 508 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 500 to enable the system configuration 500 to become coupled to other systems, remote printers, or storage devices through intervening private or public networks.

Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A computer program product comprising a non-transitory computer-useable memory having a computer-readable program, wherein the computer-readable program when executed on a computer causes the computer to:
   receive an input indicating a request for rendering of an audio source in a clip of an audio track according to an effect;
   responsive to receiving the input indicating the request for rendering of the audio source, generate a cloned audio source, the cloned audio source being a copy of a plurality of audio source settings applied to the audio source;
   responsive to receiving the input indicating the request for rendering of the audio source, generate a cloned effect, the cloned effect being a copy of the effect;
   store the cloned audio source and the cloned effect in memory at different respective locations;
   process the cloned audio source according to the cloned effect to generate a rendered output file;
   discard the cloned audio source and the cloned effect from the different respective locations in the memory responsive to completing generating the rendered output file; and
   play the rendered output file without processing the audio source according to the effect.

2. The computer program product of claim 1, wherein the computer-readable program when executed on the computer further causes the computer to generate an edited audio source based on an edit of the audio source received prior to the rendered output file being generated.

3. The computer program product of claim 2, wherein the computer-readable program when executed on the computer further causes the computer to generate a new cloned audio source and a new rendered output file based on the edited audio source and the cloned effect.

4. The computer program product of claim 1, wherein the computer-readable program when executed on the computer further causes the computer to receive an edit of the effect prior to the rendered output file being generated.

5. The computer program product of claim 4, wherein the computer-readable program when executed on the computer further causes the computer to generate a new cloned effect and a new rendered output file based on the cloned audio source and the new cloned effect.

6. The computer program product of claim 2, wherein the computer-readable program when executed on the computer further causes the computer to read a timestamp based on an edit time of the edit, the edit time being a time that the input indicating the edit was received.

7. The computer program product of claim 6, wherein the computer-readable program when executed on the computer further causes the computer to perform the edit at the edit time and generate a new cloned audio source after a difference between a current time and the edit time exceeds a predetermined threshold.

8. The computer program product of claim 1, wherein the effect is selected from the group consisting of a volume setting, a reverberation setting, a chorus setting, a delay setting, an equalizer setting, and a noise reduction setting.

9. A method comprising:
   receiving an input indicating a request for rendering of an audio source in a clip of an audio track according to an effect;
   responsive to receiving the input indicating the request for rendering of the audio source, generating a cloned audio source, the cloned audio source being a copy of a plurality of audio source settings applied to the audio source;
   responsive to receiving the input indicating the request for rendering of the audio source, generating a cloned effect, the cloned effect being a copy of the effect;
   store the cloned audio source and the cloned effect in memory at different respective locations;
   processing the cloned audio source according to the cloned effect to generate a rendered output file;
   discarding the cloned audio source and the cloned effect from the different respective locations in the memory responsive to completing generating the rendered output file; and
   playing the rendered output file without processing the audio source according to the effect.

10. The method of claim 9, further comprising generating an edited audio source based on an edit of the audio source received prior to the rendered output file being generated.

11. The method of claim 10, further comprising generating a new cloned audio source and a new rendered output file based on the edited audio source and the cloned effect.

12. The method of claim 9, further comprising receiving an edit of the effect prior to the rendered output file being generated.

13. The method of claim 12, further comprising generating a new cloned effect and a new rendered output file based on the cloned audio source and the new cloned effect.

14. The method of claim 10, further comprising reading a timestamp based on an edit time of the edit, the edit time being a time that the input indicating the edit was received.

15. The method of claim 14, further comprising performing the edit at the edit time and generating a new cloned audio source after a difference between a current time and the edit time exceeds a predetermined threshold.

16. The method of claim 9, wherein the effect is selected from the group consisting of a volume setting, a reverberation setting, a chorus setting, a delay setting, an equalizer setting, and a noise reduction setting.

17. A system comprising:
   a reception module that receives an input indicating a request for rendering of an audio source in a clip of an audio track according to an effect; and
   a processor that generates a cloned audio source, generates a cloned effect, processes the cloned audio source according to the cloned effect such that, after processing, the cloned audio source is modified to include the cloned effect, generates a rendered output file, discards the cloned audio source and the cloned effect responsive to completing generating the rendered output file, and plays the rendered output file without processing the audio source according to the effect, the cloned audio source being a copy of a plurality of audio source settings associated with the audio source that is applied to the audio source, the cloned effect being a copy of the effect.

18. The system of claim 17, further comprising a memory that stores the cloned audio source and the cloned effect.

19. The system of claim 17, further comprising a storage device that stores the rendered output file.

20. The system of claim 17, wherein the effect is selected from the group consisting of a volume setting, a reverberation setting, a chorus setting, a delay setting, an equalizer setting, and a noise reduction setting.

21. The computer program product of claim 1, wherein at least one of the plurality of audio source settings is not a start time or end time.

* * * * *